United States Patent
Bartl

(10) Patent No.: US 9,587,737 B2
(45) Date of Patent: Mar. 7, 2017

(54) METHOD FOR OPERATING A TRANSMISSION DEVICE AND CORRESPONDING TRANSMISSION DEVICE

(71) Applicant: AUDI AG, Ingolstadt (DE)

(72) Inventor: Florian Bartl, Bergheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/892,952

(22) PCT Filed: May 19, 2014

(86) PCT No.: PCT/EP2014/001342
§ 371 (c)(1),
(2) Date: Nov. 20, 2015

(87) PCT Pub. No.: WO2014/187553
PCT Pub. Date: Nov. 27, 2014

(65) Prior Publication Data
US 2016/0091086 A1 Mar. 31, 2016

(30) Foreign Application Priority Data
May 22, 2013 (DE) .................. 10 2013 008 701

(51) Int. Cl.
*F16H 61/12* (2010.01)
*F16H 61/30* (2006.01)
*F16H 61/688* (2006.01)

(52) U.S. Cl.
CPC .............. *F16H 61/12* (2013.01); *F16H 61/30* (2013.01); *F16H 61/688* (2013.01);
(Continued)

(58) Field of Classification Search
None
See application file for complete search history.

(56) References Cited

U.S. PATENT DOCUMENTS

| 2006/0289266 A1* | 12/2006 | Gierer ................. | F16H 61/0206 |
| | | | 192/85.01 |
| 2007/0170031 A1* | 7/2007 | Kohlhaas ............ | F16D 48/0206 |
| | | | 192/48.8 |
| 2011/0056314 A1* | 3/2011 | Lundberg ................ | F16H 61/12 |
| | | | 74/473.11 |

FOREIGN PATENT DOCUMENTS

| CN | 1936374 | 3/2007 |
| CN | 101806355 | 8/2010 |

(Continued)

OTHER PUBLICATIONS

International Search Report issued by the European Patent Office in International Application PCT/EP2014/001342 on Jul. 17, 2014.
(Continued)

*Primary Examiner* — Edwin A Young
(74) *Attorney, Agent, or Firm* — Henry M. Feiereisen LLC.

(57) ABSTRACT

In a method for operating a transmission device, a pressure test is carried out when switching from a standby mode to a power saving mode. When executing the pressure test the gear selector valves of the gear selectors of the transmission device are activated to assume their neutral position, and a shifting valve is activated to assume an operating position in which a flow connection between a common feed line for the gear selectors and a pressure source is cut. Subsequently, the gear selector valve of at least one of the gear selectors is activated to assume a shift position, and a position of the gear selector piston of the at least one gear selector is determined over a specific time period. The presence of a malfunction of the shifting valve is recognized when the position of the gear selector piston changes during the specific time period.

15 Claims, 1 Drawing Sheet

(52) U.S. Cl.
CPC ............... *F16H 2061/1204* (2013.01); *F16H 2061/1208* (2013.01); *F16H 2061/1264* (2013.01); *F16H 2061/1288* (2013.01)

(56) References Cited

FOREIGN PATENT DOCUMENTS

| | | |
|---|---|---|
| CN | 102062204 | 5/2011 |
| DE | 39 40 590 | 6/1990 |
| DE | 297 14 652 | 11/1997 |
| DE | 102006016412 | 10/2007 |
| DE | 102010032657 | 2/2011 |
| DE | 10 2011 085 333 | 6/2012 |
| DE | 102011100800 | 11/2012 |
| DE | 102011100809 | 11/2012 |

OTHER PUBLICATIONS

Chinese Search Report issued on Jul. 12, 2016 with respect to counterpart Chinese patent application 201480029202.7.
Translation of Chinese Search Report issued on Jul. 12, 2016 with respect to counterpart Chinese patent application 201480029202.7.

\* cited by examiner

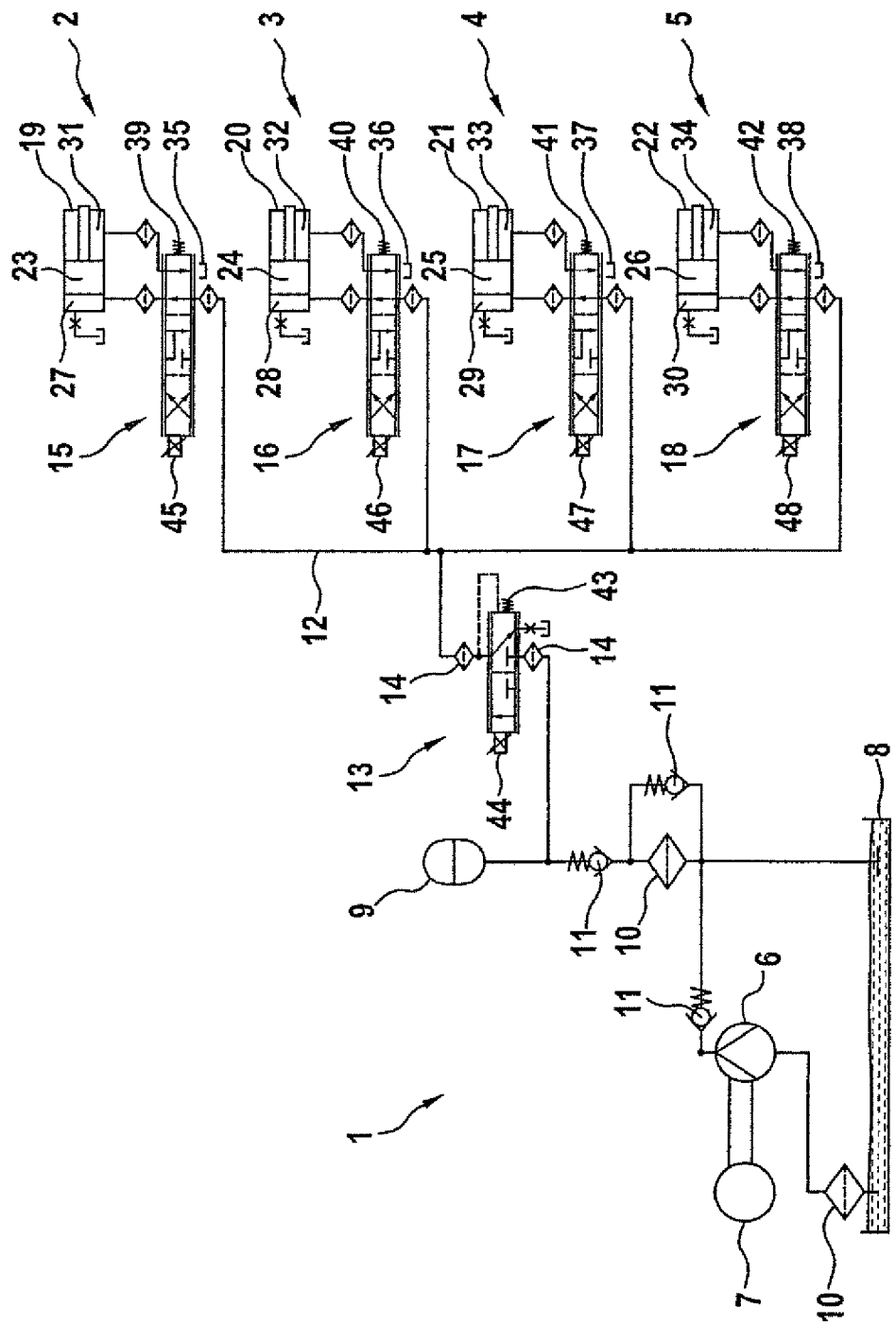

US 9,587,737 B2

METHOD FOR OPERATING A TRANSMISSION DEVICE AND CORRESPONDING TRANSMISSION DEVICE

CROSS-REFERENCES TO RELATED APPLICATIONS

This application is the U.S. National Stage of International Application No. PCT/EP2014/001342, filed May 19, 2014, which designated the United States and has been published as International Publication No. WO 2014/187553 and which claims the priority of German Patent Application, Serial No. 10 2013 008 701.5, filed May 22, 2013, pursuant to 35 U.S.C. 119(a)-(d).

BACKGROUND OF THE INVENTION

The invention relates to a method for operating a transmission device, in particular a dual-clutch transmission device, with the transmission device having plural gear selectors, each having a gear selector valve and a gear selector piston which is operatively connected to a shifting fork of the transmission device and which is arranged in a gear selector cylinder and divides the latter into a first pressure chamber and a second pressure chamber, wherein in a first shift position of the gear selector valve, the first pressure chamber has a flow connection to a common feed line, in a second shift position, the second pressure chamber has a flow connection to the common feed line, and in a neutral position, none of the pressure chambers has a flow connection to the common feed line, and wherein a flow connection of the feed line to a common pressure source is cleared in a first operating position of a shifting valve and is cut in a second operating position of the shifting valve. The invention further relates to a transmission device.

The transmission device is associated, for example, to a motor vehicle and is thus in operative connection between a drive assembly of the motor vehicle and at least one wheel or a wheel axle of the motor vehicle. The drive assembly has at least one drive unit, for example an internal combustion engine or an electric motor. The drive assembly may, however, also be constructed as hybrid drive assembly and thus have at least two different drive units, for example an internal combustion engine or an electric motor. The transmission device is provided to set a gear ratio selected from several predefined gear ratios and subsequently established especially in the afore-mentioned operative connection. The transmission device is constructed, for example, as dual-clutch transmission device.

During operation of known transmission devices, numerous valves are permanently energized in order to move them to the desired position and hold them there. As a result, energy consumption is high.

SUMMARY OF THE INVENTION

Object of the invention is thus to propose a method for operating a transmission device to obviate this drawback and to enable a significant reduction of the energy consumption, especially while still maintaining a reliable operation of the transmission device.

The object is attained in accordance with the invention by a method for operating a transmission device, in particular a dual-clutch transmission device, with the transmission device having plural gear selectors, each having a gear selector valve and a pear selector piston which is operatively connected to a shifting fork of the transmission device and which is arranged in a pear selector cylinder and divides the latter into a first pressure chamber and a second pressure chamber, wherein in a first shift position of the gear selector valve, the first pressure chamber has a flow connection to a common feed line, in a second shift position, the second pressure chamber has a flow connection to the common feed line, and in a neutral position, none of the pressure chambers has a flow connection to the common feed line, and wherein a flow connection of the feed line to a common pressure source is cleared in a first operating position of a shifting valve and is cut in a second operating position of the shifting valve. Provision is hereby made for execution of a pressure test when changing from a standby mode to a power saving mode, during which pressure test the gear selector valves of the gear selectors for setting the neutral position and the shifting valve for setting the second operating position are activated, and subsequently the gear selector valve of at least one of the gear selectors for setting one of the shift positions is activated, with the position of the gear selector piston of the respective gear selector being determined by a detection device over a specific time period and a malfunction of the shifting valve being recognized, when the position changes during the time period.

To set the desired gear ratio, the transmission device has several gear selectors. Each of the gear selectors includes a gear selector valve and a gear selector piston which is in operative connection with an associated shifting fork of the transmission device. The gear selector piston is arranged in a gear selector cylinder and divides the latter into the first pressure chamber and the second pressure chamber. The gear selector valve can now be brought into three different shift positions, that is the first shift position, the second shift position, and the neutral position. In the first shift position, the first chamber is in flow connection with the common feed line of the plural gear selectors. This applies for the second chamber in the second shift position. Conversely, in the neutral position the flow connection between both chambers and the common feed line is cut.

While one of the two chambers is in flow connection with the common feed line, provision is preferably made to cut the flow connection between the respectively other chamber and the feed line. The respectively other chamber is in particular in flow connection with a drain in which a lower pressure is present than in the common feed line. Accordingly, the gear selector piston is displaced—so long as a sufficiently high pressure prevails in the common feed line—in the gear selector cylinder to the one direction which faces away from the chamber in flow connection with the feed line. In the first shift position, the gear selector piston is thus displaced in the gear selector cylinder in direction of the second chamber and in the second shift position in direction of the first chamber. Conversely, in the neutral position, the gear selector piston should be substantially stationary.

For this purpose, either both pressure chambers are fluidly closed or, as an alternative, in flow connection with one another, so that the same pressure prevails in both pressure chambers. When the gear selector piston is displaced, the shifting fork, operably connected therewith, is displaced accordingly. The shifting fork is provided, for example, to arrange a shifting sleeve of the transmission device such that the desired gear is engaged or the desired gear ratio is set. Preferably, two gears or gear ratios of the transmission device are associated to each shifting fork and thus each gear selector.

Thus, the gear selector piston can, preferably, be arranged in three positions, that is a freewheel position, a first selection position, and a second selection position. In the freewheel position, the gear selector piston and thus the shifting fork are arranged such that no gear is engaged with the assistance of the respective gear selector. Conversely, in the first selection position, a particular gear is engaged, and in the second selection position another gear, different from this gear, is engaged with the assistance of this gear selector. For example, the freewheel position is established, when the gear selector piston is arranged in an intermediate position in the gear selector cylinder, from which intermediate position, the gear selector piston can be displaced in direction of the first chamber as well as in direction of the second chamber.

The transmission device includes a common pressure source by which the common feed line and thus the plural gear selectors can be subjected to pressure. The shifting valve is provided in the flow connection between the common feed line and the common pressure source and clears the flow connection in its first operating position and closes it in its second operating position. Using the shifting valve, the flow connection between the pressure source on one hand and the feed line or the gear selector on the other hand can be cut.

Overall, it is the objective of the invention, to de-energize in the power saving mode as many of the valves, in particular the gear selector valves of the gear selectors and/or shifting valves, as possible. To ensure a reliable operation of the transmission device, it is, however, necessary to lower the pressure in the feed line or to cut the flow connection of the feed line to the common pressure source. This is especially the case since the gear selector valves are preferably constructed such as to assume in the de-energized state one of the shift positions so that the gear selector piston would have been displaced if the feed line was still in flow connection with the pressure source. When, for example, de-energizing the gear selector valves of all gear selectors, while the feed line is still connected with the pressure source, i.e. the feed line is still under pressure sufficient to displace the gear selector piston, all gear selector pistons would then be displaced to a selection position and as a consequence a gear is engaged on the transmission device for each gear selector. This would, however, result in a blockage of the transmission device and in the extreme case lead to damage. This, however, should be prevented.

For this reason, the pressure test is executed before switching from the standby mode to the power saving mode. In the standby mode, the gear selector valves of all gear selectors are, for example, activated such as to assume their respective neutral position. At the same time, the shifting valve for setting the first operating position is activated so that the feed line is in flow connection with the common pressure source. When the transmission device assumes the standby mode, a gear change is thus feasible rapidly and promptly by activating the respective gear selector or the respective gear selectors. Conversely, in the power saving mode, as many valves as possible should be de-energized in the manner as described above. This is provided in particular for the gear selector valves of all gear selectors as well as for the shifting valve.

The pressure test is executed by initially energizing or activate the gear selector valves of the gear selectors, in particular all gear selectors, such that the respective neutral position is set. At the same time, the shifting valve for setting the second operating position is activated. Hereby, it is not yet known whether the shifting valve has, in fact, successfully reached the second operating position in which the flow connection between the feed line and the pressure source is cut. For example, there may be a situation in which the shifting valve for setting the second operating position is activated but has not yet reached it because, for example, of the presence of dirt particles in the shifting valve and/or the shifting valve remains in the first operating position. In this case, there is still a flow connection even after activation of the shifting valve for setting the second operating position. This, however, is subsequently detected during the pressure test.

For this purpose, the gear selector valve of at least one of the gear selectors is activated such that one of the shift positions is activated. Since a detection device or a distance determination device is associated to each of the gear selector pistons of the gear selectors, the position of the respective gear selector piston can be determined by this detection device over a specific time period. When ascertaining within this time period a change in the position of the gear selector piston, it can be concluded that the feed line is still in flow connection with the pressure source, i.e. the feed line is under pressure sufficient to displace the respective gear selector piston. In this case, the presence of a malfunction of the shifting valve is recognized and, preferably there is no change from the standby mode to the power saving mode. For example, when detecting the malfunction of the shifting valve, an emergency operation of the transmission device is triggered.

According to a further configuration of the invention, the gear selector valves are continuously subjected to a restoring force directed in direction of one of the shift positions and/or the shifting valve is continuously subjected to a restoring force directed in direction of the second operating position. The restoring force is realized, for example, by a spring and thus can also be designated as spring force. The restoring force acts permanently or continuously upon the respective valve and is directed to urge the valve into one of the shift positions, i.e. either to the first shift position or the second shift position or the second operating position. When the respective valve is activated, an actuation force, for example by using a magnetic device, is generated, which actuation force is provided to set the desired position of the respective valve and normally acts in opposition of the restoring force. For example, in order to hold the gear selector valve in its neutral position, an actuation force must permanently be generated of a magnitude which is as great as the opposing restoring force.

According to a refinement of the invention, a change from the standby mode to the power saving mode is triggered, when the gear selector valves assume their neutral position over a specific time period. There is no change of the engaged gear on the transmission device in the neutral position of the gear selector valves. Thus, when the gear selector valves are in the neutral position over a specific time period, it can be assumed that no gear change should be executed at least for a specific time. To save energy, switch to the power saving mode can thus be executed. As a result, the change is initiated, with the pressure test, as explained above, being initially executed prior to the actual change. Switching from the standby mode to the power saving mode is executed only when the pressure test is successful, i.e. no malfunction of the shifting valve has been detected. When a malfunction is detected, an emergency operation is triggered for example.

According to a preferred configuration of the invention, the gear selector valve of at least one of the gear selectors for setting one of the shift positions is activated when the gear selector valve is de-energized. Activation of the gear selector valve during the pressure test is thus implemented such that the gear selector valve is de-energized so that in particular the afore-described restoring force is able to effect a displacement to the respective one of the shift positions. When the gear selector piston is then displaced and this displacement is detected by the detection device within the specific time period, the presence of a malfunction of the shifting valve is recognized.

According to a further configuration of the invention, a switch from the standby mode to the power saving mode is implemented, when the position has not changed during the time period. This has been described already above. Of course, a switch to the power saving mode is only possible, i.e. as many valves as possible, especially all valves, are de-energized when the flow connection between the feed line and the pressure source has been successfully cut to prevent blockage of the transmission device or damage.

It is, preferably, provided that a switch from the power saving mode to the standby mode is realized by activating the gear selector valves for setting the neutral position and by activating, after a specific waiting time, the shifting valve for setting the first operating position. Thus, when switching from the standby mode to the power saving mode, after carrying out a successful pressure test during which no malfunction of the shifting valve has been recognized, and when a gear change should now be executed, it is first necessary to switch again from the power saving mode to the standby mode. For this purpose, the gear selector valves are initially activated such as to assume their neutral position. As already described above, in this neutral position none of the pressure chambers is in flow connection with the common feed line. After activation, elapse of the specific waiting period is awaited to ensure that the gear selector valves have reached their neutral position. Subsequently, the shifting valve for setting the first operating position can be activated and thus the establishment of the flow connection between the pressure source and the common feed line. Then, the feed line is thus under pressure sufficient to displace the gear selector pistons in the gear selectors and to execute a gear change.

According to a preferred configuration of the invention, a holding device is associated to each of the gear selector pistons in order to urge the respective gear selector piston at a specific holding force in its current position. The holding device is, for example, a locking device which defines locking positions which are assigned to the positions of the gear selector valve, i.e. the neutral position and the two shift positions. The gear selector piston is held by the holding device or locking device in its currently present position, i.e. the freewheel position, the first selection position, or the second selection position. This holding force has to be overcome in order to displace the gear selector piston within the gear selector cylinder between its different positions. A respective pressure in the feed line is required to overcome the holding force. The provision of the holding device ensures that the gear selector piston is not displaced and thus a gear change is implemented in the neutral position of the respective gear selector valve, even in the presence of a (slight) pressure differential between the first pressure chamber and the second pressure chamber.

According to a refinement of the invention, during the pressure test the gear selector valve of the one gear selector for setting one of the shift positions is activated, which gear selector is not assigned to the current driving gear. The current driving gear is the one gear with which the currently present gear ratio of the transmission device is provided, in particular in the operative connection between the drive assembly and the at least one wheel of the motor vehicle. To execute the pressure test, the hereby used gear selector is chosen such that the current driving gear is not disengaged or changed. The gear selector should thus not be associated to the current driving gear.

Finally, provision may be made to provide the dual-clutch transmission with two transmission trains which are each associated to a clutch, with the clutch of the transmission train which is not associated to the current driving gear being opened, and with the gear selector valve of at least one gear selector, associated to this transmission train, for setting one of the shift positions, being activated during the pressure test. The transmission device should be constructed as dual-clutch transmission device and includes thus two transmission trains, with each of these transmission trains having a separate clutch, by which an operative connection to an output shaft of the transmission device or the at least one wheel of the motor vehicle can be established.

During operation of the transmission device, a driving gear is engaged at all times, unless an idle operation is selected. To transmit a torque, provided by the drive assembly, to the at least one wheel of the motor vehicle, the one clutch of the transmission train is closed which clutch is associated to the currently engaged driving gear. Conversely, the clutch of the respectively other transmission train is opened. This means, however, that any gear can be engaged in this respectively other transmission train, without causing a blockage of the transmission device. As a result, when executing the pressure test, a gear selector valve is activated which is associated to the transmission train that does not have the current driving gear.

The invention further relates to a transmission device, in particular for executing the afore-described method, including plural gear selectors, each having a gear selector valve, and a gear selector piston in operative connection with a shifting fork of the transmission device and arranged in a gear selector cylinder to divide the gear selector cylinder into a and a second pressure chamber, wherein the first pressure chamber is in flow connection with the feed line in a first shift position of the gear selector valve, the second pressure chamber is in flow connection with the feed line in a second shift position, and none of the pressure chambers is in flow connection with the feed line in a neutral position, and wherein a flow connection of the feed line to a common pressure source is cleared in a first operating position and cut in a second operating position of the shifting valve.

Provision is hereby made to construct the transmission device such that a pressure test is executed when switching from a standby mode to a power saving mode, during which pressure test the gear selector valves of the gear selectors for setting the neutral position as well as the shifting valve for setting the second operating position are activated, and subsequently, the gear selector valve of at least one of the gear selectors for setting one of the shift positions is activated, with the position of the gear selector piston of the respective gear selector being determined by means of a detection device over a specific time period and a malfunction of the shifting valve is detected, when the position changes during the time period. Reference has already been made to the advantages of such a configuration of the transmission device or such a procedure. Both the method and the transmission device may be refined in accordance with the above description so that reference is made thereto.

BRIEF DESCRIPTION OF THE DRAWING

Exemplary embodiments of the invention will now be described in greater detail with reference to the drawing, without limiting the invention. The sole FIGURE shows hereby a schematic illustration of a transmission device, in particular a dual-clutch transmission device.

DETAILED DESCRIPTION OF PREFERRED EMBODIMENTS

The FIGURE shows a schematic illustration of a transmission device 1, which is constructed for example as dual-clutch transmission device. The transmission device 1 has plural gear selectors 2, 3, 4 and 5, although basically any number of gear selectors may be provided. In principle, it is also conceivable to provide a configuration with only a single gear selector. Particularly preferred are, however, at least two gear selectors. Associated to the gear selectors 2, 3, 4 and 5 is a common pressure source 6, for example in the form of a conveying device. The conveying device is operated, for example, by an electric motor 7 and provided to transport hydraulic fluid from a tank 8 in direction of the gear selectors 2, 3, 4 and 5. A pressure tank 9 can be associated to the pressure source 6 and is provided to keep hydraulic fluid under pressure, even when the pressure source 6 momentarily provides only a lower pressure. A filter 10 can be provided between the pressure source 6 and the tank 8, likewise in the flow connection between the pressure source 6 and the pressure tank 9. At least one non-return valve 11 may also be provided in the flow connection between the pressure source 6 and the pressure tank 9. Further discussion in this context in greater detail is omitted however.

Provided in the flow connection between the pressure source 6 or pressure tank 9, on one hand, and a common feed line 12 of the gear selectors 2, 3, 4 and 5, is a shifting valve 13 which has at least two operating positions, that is a first operating position and a second operating position. In the first operating position, the flow connection between the common pressure source 6 or pressure tank 9 and the feed line 12 is cleared. Conversely, in the second operating position of the shifting valve 13, the flow connection is cut. At least one filter 14 can be associated to the shifting valve 13.

Connected to the common feed line 12 are gear selector valves 15, 16, 17 and 18 of the gear selectors 2, 3, 4 and 5. The gear selector valves 15, 16, 17 and 18 are disposed in a flow connection between the feed line 12 and a gear selector cylinder 19, 20, 21 and 22, respectively, in each of which a gear selector piston 23, 24, 25 and 26 is respectively movably arranged. Each of the gear selector pistons 23, 24, 25 and 26 is respectively operably connected with a shifting fork, not shown in greater detail, of the transmission device 1. The shifting fork is provided in particular to displace a shifting sleeve of the transmission device 1 for engaging a particular gear.

Each of the gear selector pistons 23, 24, 25 and 26 can be arranged preferably in a freewheel position, a first selection position, and a second selection position. The shifting fork is arranged in the freewheel position such that none of the gears respectively associated to the gear selectors 2, 3, 4 and 5 is engaged. Conversely, in the first selection position, a first gear is engaged in terms of a first gear ratio, and in the second selection position, a second gear is engaged in terms of a second gear ratio, with both gear ratios being preferably different from one another.

The gear selector pistons 23, 24, 25 and 26 divide the respective gear selector cylinder 19, 20, 21 and 22 in a first pressure chamber 27, 28, 29 and 30 and a second pressure chamber 31, 32, 33 and 34. Depending on the respective gear selector valve 15, 16, 17 and 18, the first pressure chamber 27, 28, 29 and 30 or the second pressure chamber 31, 32, 33 and 34 is subjected to pressure prevailing in the common feed line 12. The respectively other pressure chamber is then preferably in flow connection with a drain 35, 36, 37 and 38. Conversely, when the gear selector valves 15, 16, 17 and 18 assume a neutral position, none of the pressure chambers 27 and 31, 28 and 32, 29 and 33, and 30 and 34 is in flow connection with the feed line 12. Rather, provision can be made for both pressure chambers to be in flow connection with the respective drain 35, 36, 37 and 38 and accordingly with one another.

Each of the gear selector valves 15, 16, 17 and 18 has a spring element 39, 40, 41 and 42 which urges it in direction of one of its shift positions, for example in the first shift position in which the first pressure chamber 27, 28, 29 and 30 is in flow connection with the feed line 12. Likewise, the shifting valve 13 includes a spring element 43 which urges it in direction of its second operating position, in which the flow connection between the feed line 12 and the pressure source 6 or pressure tank 9 is cut. Each of the valves has an actuating device 44, 45, 46, 47 and 48, by which an actuating force can be generated which acts in opposition to the restoring force, generated by the spring elements 39, 40, 41, 42 and 43, and accordingly the desired position of the respective valve 13, 15, 16, 17 and 18 can be adjusted.

In such a transmission device 1, the valves 13, 15, 16, 17 and 18 must be permanently energized to assume the first operating position or the respective neutral position. In the presence of the first operating position and also all neutral positions, the transmission device 1 assumes a standby mode. As the valves 13, 15, 16, 17 and 18 are continuously energized, energy consumption is high. For that reason, if possible, a switch from the standby mode to a power saving mode should be implemented to de-energize at least some of the valves 13, 15, 16, 17 and 18, preferably to all valves 13, 15, 16, 17 and 18.

As, however, the spring elements 39, 40, 41 and 42 respectively urge the gear selector valves 15, 16, 17 and 18 from the neutral position into one of their shift positions, it must be ensured beforehand that the shifting valve 13 assumes in fact its second operating position, i.e. the flow connection between the pressure source 6 or pressure tank 9 and the feed line 12 is in fact cut. For this purpose, all gear selector valves 15, 16, 17 and 18 for setting their respective neutral position are initially activated. After a specific waiting time, which should ensure that indeed all gear selector valves 15, 16, 17 and 18 assume their neutral position, the shifting valve 13 for setting the second operating position is activated. Also in this case, a specific waiting time has then to elapse.

Thereafter, at least one of the gear selector valves 15, 16, 17 and 18 is activated such as to reach one of its shift positions. This is executed, especially preferred, by de-energizing the respective gear selector valve 15, 16, 17 and 18, so that the restoring force effects the setting into the respective shift position.

Using a detection device, not shown here, the position of the gear selector piston 23, 24, 25 and 26, associated to the used gear selector valve 15, 16, 17 and 18, is monitored over a specific time period. When determining a change in position within this time period, malfunction of the shifting valve 13 is recognized and the change to the power saving mode is preferably not executed or stopped. In this way, it is ensured that no blockage of the transmission device 1 is caused, which could potentially lead to damage.

What is claimed is:

1. A method for operating a transmission device including plural gear selectors, each having a gear selector piston operatively connected to a shifting fork of the transmission device and arranged in a gear selector cylinder to divide the gear selector cylinder into first and second pressure chambers, a gear selector valve movable to a first shift position in which the first pressure chamber is in flow connection to a common feed line, a second shift position in which the second pressure chamber is in flow connection to the common feed line, and a neutral position in which none of the pressure chambers has a flow connection to the common feed line, and a shifting valve movable to a first operating position in which the feed line is in flow connection to a common pressure source, and a second operating position in which the flow connection between the feed line and the common pressure source is cut, said method comprising:

executing a pressure test when switching from a standby mode in which the gear selector valve assumes the neutral position, to a power saving mode in which at least a plurality of the gear selector valves of the gear selectors are de-energized, said pressure test comprising:

activating the gear selector valves of the gear selectors to assume their neutral position, activating the shifting valve to assume the second operating position, subsequently activating the gear selector valve of at least one of the gear selectors to assume one of the shift positions, determining a position of the gear selector piston of the at least one of the gear selectors by a detection device over a specific time period, and recognizing the presence of a malfunction of the shifting valve when the position of the gear selector piston changes during the specific time period.

2. The method of claim 1 for operating a dual-clutch transmission device.

3. The method of claim 2, wherein the dual-clutch transmission includes two transmission trains which are each associated to a clutch, with the clutch of the transmission train which is not associated to a current driving gear being opened, and with the gear selector valve of the at least one gear selector being associated to said transmission train.

4. The method of claim 1, wherein the pressure test further comprises continuously imposing a restoring force upon the gear selector valves in a direction of one of the shift positions and/or continuously imposing a restoring force upon the shifting valve in a direction of the second operating position.

5. The method of claim 1, further comprising initiating a switch from the standby mode to the power saving mode, when the gear selector valves assume their neutral position over a specific time period.

6. The method of claim 1, wherein the pressure test further comprises de-energizing the gear selector valve of the at least one of the gear selectors to activate the gear selector valve of the at least one of the gear selectors.

7. The method of claim 1, further comprising implementing a switch from the standby mode to the power saving mode, when no change in the position is determined during the specific time period.

8. The method of claim 1, further comprising switching from the power saving mode to the standby mode by activating the gear selector valves to assume their the neutral position and activating the shifting valve to assume the first operating position after elapse of a specific waiting time.

9. The method of claim 1, further comprising associating a holding device to the gear selector valve of each of the gear selectors to urge the gear selector piston with a specific holding force into its current position.

10. The method of claim 1, wherein the gear selector valve of the at least one gear selector is activated which, during the pressure test, is not associated to a driving gear.

11. A transmission device, comprising:

plural gear selectors, each having a gear selector piston operatively connected to a shifting fork of the transmission device and arranged in a gear selector cylinder to divide the gear selector cylinder into first and second pressure chambers, a gear selector valve movable to a first shift position in which the first pressure chamber is in flow connection to a common feed line, a second shift position in which the second pressure chamber is in flow connection to the common feed line, and a neutral position in which none of the pressure chambers has a flow connection to the common feed line, and a shifting valve movable to a first operating position in which the feed line is in flow connection to a common pressure source, and a second operating position in which the flow connection between the feed line and the common pressure source is cut; and a detection device, said transmission device being constructed to execute a pressure test when switching from a standby mode in which the gear selector valve assumes the neutral position, to a power saving mode in which at least a plurality of the gear selector valves of the gear selectors are de-energized, said pressure test comprising activating the gear selector valves of the gear selectors to assume their neutral position, activating the shifting valve to assume the second operating position, subsequently activating the gear selector valve of at least one of the gear selectors to assume one of the shift positions, determining a position of the gear selector piston of the at least one of the gear selectors by the detection device over a specific time period, and recognizing the presence of a malfunction of the shifting valve when the position of the gear selector piston changes during the specific time period.

12. The transmission device of claim 11, constructed in the form of a dual-clutch transmission device.

13. The transmission device of claim 12, wherein the dual-clutch transmission includes two transmission trains which are each associated to a clutch, with the clutch of the transmission train which is not associated to a current driving gear being opened, and with the gear selector valve of the at least one gear selector being associated to said transmission train.

14. The transmission device of claim 11, further comprising a force-transmitting member constructed to continuously impose a restoring force upon the gear selector valves in a direction of one of the shift positions and/or a force-transmitting member constructed to continuously impose a restoring force upon the shifting valve in a direction of the second operating position.

15. The transmission device of claim 11, further comprising a holding device operably connected to the gear selector valve of each of the gear selectors to urge the gear selector piston with a specific holding force into its current position.

* * * * *